Jan. 7, 1969 V. O. JOHNSON, JR 3,419,996

TURKEY CALLER

Filed March 28, 1966

Vedna O. Johnson, Jr.
*INVENTOR.*

United States Patent Office 3,419,996
Patented Jan. 7, 1969

3,419,996
TURKEY CALLER
Vedna O. Johnson, Jr., Gould, Ark. 71643
Filed Mar. 28, 1966, Ser. No. 537,744
U.S. Cl. 46—189
Int. Cl. A63h 5/00; G08b 3/00
5 Claims

ABSTRACT OF THE DISCLOSURE

An elongated tubular body which flares gradually toward one end and defines a small diameter mouthpiece at the other end. The diameter of the mouthpiece end of the tubular body is sufficiently small to enable the mouthpiece to be received between the lips of the user when his lips are pressed tightly together, simulated turkey yelps being produced by the user sharply drawing into his mouth through the tubular body.

---

This invention relates to a novel and useful turkey caller and more specifically to a turkey caller specifically designed to imitate turkey calls, yelps, chatter or clucks.

The turkey caller of the instant invention includes an elongated tubular body defining a bell-shaped end at one end and a small diameter mouthpiece at the other end. The mouthpiece is adapted to be received between the center portions of the user's lips when the latter are pressed tightly together. The caller may be then caused to produce sounds simulating turkey calls and yelps, etc. by the user sharply drawing air into his mouth through the tubular body member of the caller and between the center portions of his lips pressed tightly together and about the mouthpiece of the caller.

The caller is constructed of a rigid material, preferably wood, and the bell end thereof is caused to vibrate by the vibrations of the user's lips transmitted through the tubular body member from the mouthpiece end thereof to the bell end thereof and thereby amplifies the sound of the vibrating lips of the user.

The main object of this invention is to provide a novel turkey caller which, with practice, may be utilized to more accurately reproduce certain of the sounds made by wild turkeys than has been previously possible by the use of turkey callers including two relatively movable portions disposed in frictional contact with each other and caused to vibrate by relative movement of the two movable portions thereof in contact with each other.

Another object of this invention, in accordance with the immediately preceding object, is to provide a turkey caller which may be utilized to simulate a great variety of sounds made by wild turkeys.

A further object of this invention is to provide a turkey caller in accordance with the preceding objects and which may be readily carried in the user's pocket or hand and almost instantaneously utilized to produce a varied assortment of wild turkey sounds.

Another and very important object of this invention is to provide a turkey caller which will be unaffected in its sound producing capabilities by changes in temperature and humidity.

Still another object of this invention is to provide a one piece caller having no moving parts to become worn or otherwise defective and thus render the caller ineffective.

A final object of this invention to be specifically enumerated herein is to provide a turkey caller which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
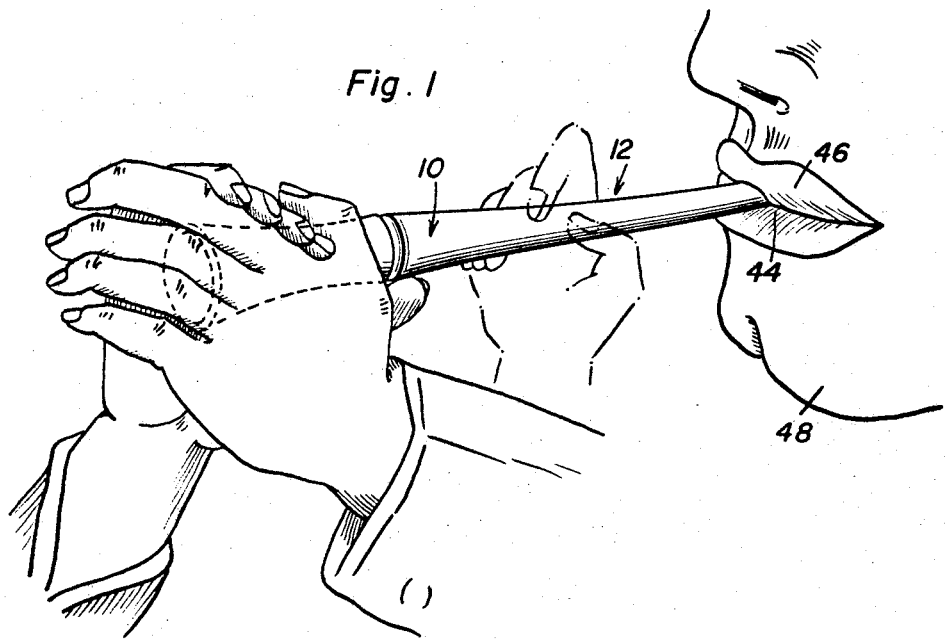
FIGURE 1 is a perspective view of the caller with the latter shown in use.
Figure 2:
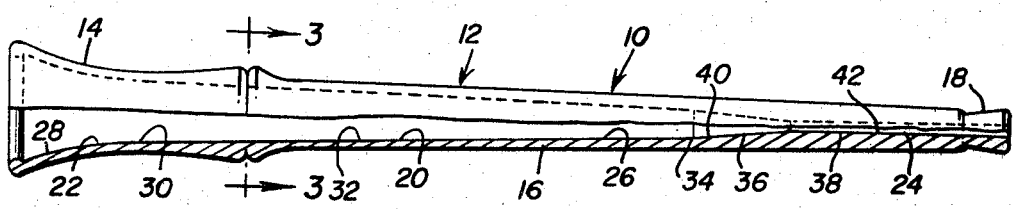
FIGURE 2 is a side elevational view of the caller with one-half thereof being broken away and illustrated in longitudinal section.
Figure 3:
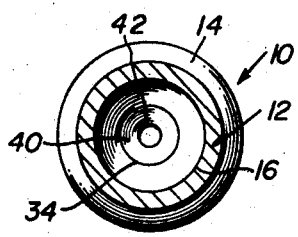
FIGURE 3 is an enlarged fragmentary transverse sectional view taken substantially upon the plane indicated by the section line 3—3 of FIGURE 2.

Referring now more specifically to the drawings, the numeral 10 generally designates the caller of the instant invention. The caller 10 includes an elongated tubular body member generally referred to by the reference numeral 12 and includes a bell-shaped outlet end 14, a center section 16, and a mouthpiece forming end portion 18. The body 12 is tubular in construction defining a passage 20 extending longitudinally therethrough. The passage 20 includes a first end section 22, a second end section 24 and a center end section 26 disposed between the end sections 22 and 24.

The first end section 22 of the passage 20 includes inner wall surfaces 28 which are flared outwardly toward the outlet end 14 and define a bell-shaped outlet. The first end section 22 terminates inwardly at 30 and the inner wall surfaces 32 of the center section 16 converge slightly toward the end of the center section 16 remote from the outlet end 14 and terminating at 34. The second end section 24 of the passage 20 includes first and second portions 36 and 38 and the first portion 36 communicates the second portion 38 with the center section 16 and the inner wall surfaces 40 of the body 12 in the first section 36 converge toward the second section 38 at a greater rate than the inner wall surfaces 32 converge toward the first section 36. The inner wall surface 42 of the second section 38 are of substantially constant diameter throughout the length of the second section 38 and it will be noted that the thickness of the walls of the body 12 defining the second section 38 is almost twice as great as the inside diameter of the second section 38. Further, it will be noted that the thickness of the walls of the body defining the outlet end 14 and the center section 16 of the body 12 is less than the thickness of the walls of the body 12 defining the second section 38.

In use, the caller 10 may be grasped by either hand as illustrated in FIGURE 1 of the drawings with the other hand or both hands at least partially cupped over the outlet end 14 of the body 12. Then, with the mouthpiece end portion 18 of the body 12 disposed between the center portions of the lips 44 and 46 of the user 48, the user 48 may press his lips 44 and 46 fairly tightly together while drawing air in between his lips 44 and 46 in the areas thereof in registry with the end of the passage 20 opening through the mouthpiece end portion 18.

After practicing use of the caller 10, the user 48 should be able to accurately reproduce the calls, yelps, chatter and clucks made by a wild turkey it being understood that the hands of the user 48 adjacent the outlet end 14 of the body 12 may also be used to change the sound made by the caller 10 by more closely or less closely cupping the outlet end 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A turkey caller comprising an elongated tubular member open at its opposite ends and defining a passage extending longitudinally therethrough including first and second opposite end sections and a center section disposed between said opposite end sections, the inner walls of said passage in said first end section being outwardly flared and defining an outlet end thereof, the inner walls in said center section, from the minor diameter end of said outlet end of said passage, gradually converging toward each other to a minor diameter zone of said center section defining the end thereof remote from said outlet end and communicated with the inner end of said second end section of said passage, the end of said tubular member remote from said outlet end including means defining a mouthpiece through which the outer end of said second end section of said passage opens, said tubular member being constructed of rigid material and the outside diameter of said mouthpiece being sufficiently small for reception between the lips of a user of the caller with the outer portions of the lips forming an airtight seal about the outer surface portions of the mouthpiece and the inner portions of the user's lips disposed inwardly of and in registry with the terminal end of the mouthpiece and pressed tightly together for vibration upon air being drawn into the user's mouth through the caller.

2. The combination of claim 1 wherein said outer end of said second end section of said passage opening through said mouthpiece is of smaller diameter than the minor diameter zone of said center section.

3. The combination of claim 1 wherein said second end section includes an end portion remote from said mouthpiece communicated with said center section and which tapers in diameter toward said mouthpiece at a greater rate than the taper of said center section, the major diameter end of said tapering end portion opening into said minor diameter zone.

4. The combination of claim 3 wherein the end portion of said second end section remote from said center section is substantially constant in diameter from the minor diameter end of said tapered end portion to the point at which said passage opens outwardly of said mouthpiece.

5. The combination of claim 1 wherein the thickness of the walls of said tubular member defining said first end and center sections is less than the thickness of said walls defining the mouthpiece end of said second end section.

References Cited

UNITED STATES PATENTS 1,528,523   3/1925   Beck _____ 46—181
2,385,752   9/1945   Wilson _____ 46—181

LOUIS G. MANCENE, *Primary Examiner.*

R. F. CUTTING, *Assistant Examiner.*

U.S. Cl. X.R.

84—387